F. TREAT.
Treadles for Machinery.

No. 149,360.            Patented April 7, 1874.

Witnesses
Thos. H. Hutchins
H. Lowe

Inventor
Francis Treat.

AM. PHOTO-LITHOGRAPHIC Co. N.Y. (OSBORNE'S PROCESS.)

UNITED STATES PATENT OFFICE.

FRANCIS TREAT, OF JOLIET, ILLINOIS.

IMPROVEMENT IN TREADLES FOR MACHINERY.

Specification forming part of Letters Patent No. 149,360, dated April 7, 1874; application filed September 13, 1873.

*To all whom it may concern:*

Be it known that I, FRANCIS TREAT, of the city of Joliet, in Will county, and State of Illinois, have invented certain Improvements in Treadle for Propelling Corn-Shellers, of which the following is a specification:

The nature of my invention consists mainly in the use of a double treadle, applied to either or both ends of the main or crank shaft of corn-shellers, by short cranks or ratchets and connecting rods or pitmen, as a means of propelling the same.

In order to enable others skilled in the art to make and use my invention, I will proceed to explain its construction and operation, reference being had to the annexed drawings making a part of this specification, in which—

Figure 1:
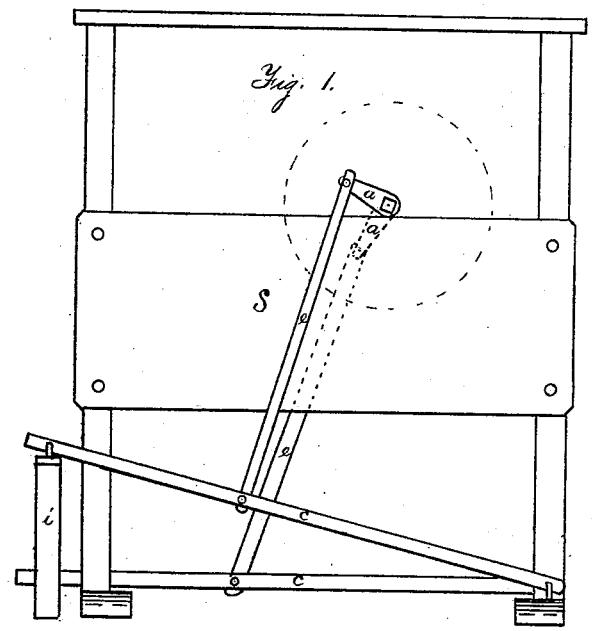
Figure 2:
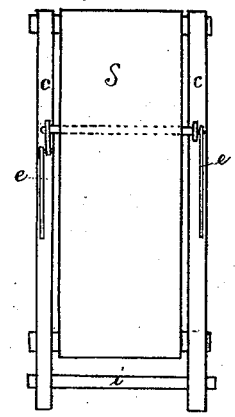

Figure 1 is a side elevation of a corn-sheller with the treadles attached, and Fig. 2 a plan view on the top of the corn-sheller and treadles.

In the drawings, $s\ s$ represent the body of a corn-sheller, showing the main shaft $o$ with the cranks $a$ attached thereto at either end, and set at right angles with each other, so there can be no dead-points for the creation of an unequal motion, and always being in proper position for starting by the pressure of the foot on the treadles. To the cranks are attached the connecting-rods $e\ e$, the lower ends of which are pivoted into the treadles $c$, as shown in Fig. 1. The treadles $c$ are hinged at one end to the lower portion of one of the ends of the corn-sheller frame, and are connected at the other end by means of the cross or oscillating bar or treadle $i$, hinged to the lower sides thereof, as shown. The cranks are intended and so constructed and arranged that they may be placed in any position desired in relation with each other, either at right angles, as shown, or in opposition, if desired, when operated by two persons, one on each or either side of the machine, in which position there will be a continuous and acting power applied, while each operator stands in proper position for feeding the sheller with his hands. The cranks $e$ can also be placed in conjunction, in which case they will operate substantially as one treadle, with the advantages that they can be used from either side, or at the end, or all at once, and the advantage obtained is that one forms a guide for the other by their attachment, holding each other steadily in position, and thereby preventing any side or oscillating motion.

This device, or portions thereof, can be used, and will successfully operate any decently easy or light-running hand corn-sheller by attaching one of the cranks, treadle, and connection to the end of the driving-shaft in the place of the hand-crank, and in lieu thereof, and operated by the foot instead of the hand.

The object and advantage obtained by this mode of propelling corn-shellers or other machines are that it furnishes a more easy and agreeable as well as a more simple muscular effort and action, and in which the whole weight of the body can be used in a most natural, simple, and habitually practical manner, and without the tiresome and unpleasant effect upon the body, arm, chest, and system generally which is produced by the turning of a crank for any length of time; secondly, a much higher rate of working speed is thereby obtained; and, thirdly, economy of labor or help, as by this mode one person can run the sheller with his foot, and feed at the same time with his hands, with as much rapidity and ease as two can upon a common crank-sheller; but in case two individuals, as already stated, desire to operate together, standing on either side of the mill, each can use the treadle and feed, aiding and assisting each other without interference, and with the same proportion of economy, or nearly so, as before stated.

The greatest advantage gained by this invention is derived from the fact that the hand corn-sheller is an implement of almost every-day use for shelling in small quantities at one time, and yet they are so constructed as to be very inconvenient, if not impossible, for one person to shell without help; and help is not always at hand and convenient, but generally the reverse, even when one has the second person at his command, and thus it results that, in a majority of cases, more time is consumed in waiting for help than it will take to do the work when the final co-operation is obtained. The unpleasantness of turning, together with the last-named objection, has been of so serious a nature as to largely prevent the introduction and use of the hand corn-sheller. This invention covers at once these objections, giving the machine great superiority and ease in action and convenience of use, making one independent of others' help in the working thereof.

Having thus described my invention, what I claim as new, and desire to secure by Letters Patent, is as follows:

The combination of the shaft $o$, cranks $a\ a$, connecting-rods $e\ e$, and treadles $c\ c$ and $i$, constructed to operate substantially as and for the purposes as set forth.

FRANCIS TREAT.

Witnesses:
   THOS. H. HUTCHINS,
   T. T. PROSSER.